3,379,942
DIELECTRIC GLASSES AND CAPACITORS
EMPLOYING SUCH GLASSES
Earl K. Davis, Monroeville, Pa., assignor to Westinghouse Electric Corporation, East Pittsburgh, Pa., a corporation of Pennsylvania
Filed Nov. 13, 1964, Ser. No. 410,910
12 Claims. (Cl. 317—258)

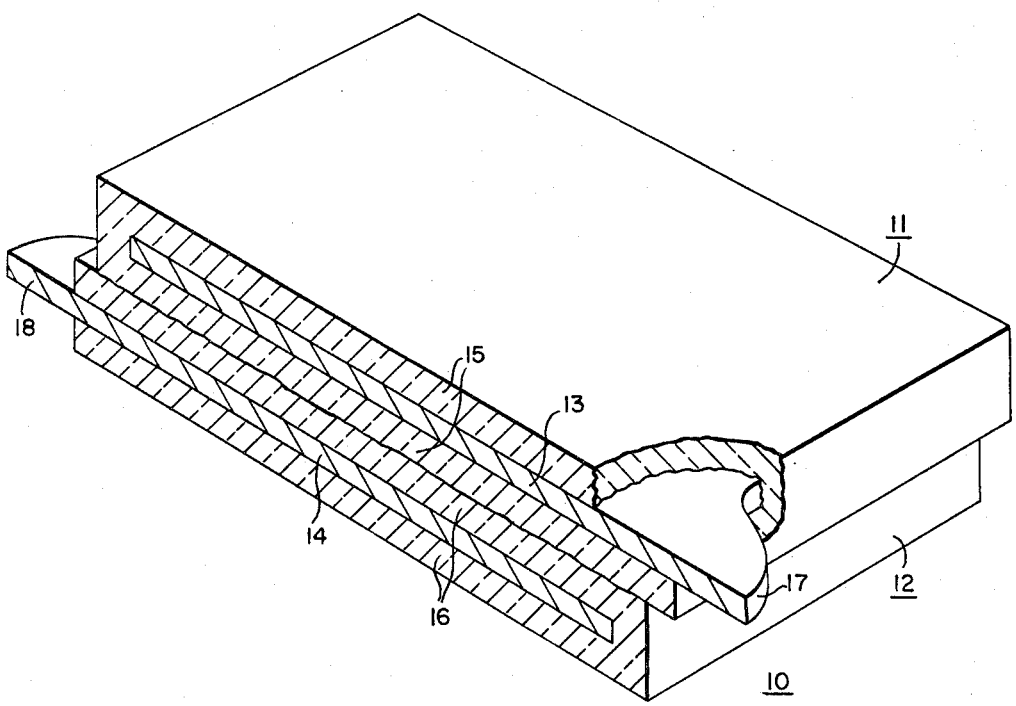

This invention relates to novel barium-borate glass compositions having properties which make the compositions particularly suitable for use as capacitor dielectrics. The invention also relates to capacitors employing the glass compositions as dielectric layers.

Glass capacitors composed of metal conductor plates separated by a glass dielectric composition may be made by various methods. The processes most widely employed require the glass dielectric layers to be first formed into individual plates. In one of the processes, the individual glass plates are stacked with alternating interleaved metal plates. The stack is fused together so that the glass plates are bonded to the metal plates and the stack is welded into a monolithic mass. The metal plates are, of course, separated by a layer of the glass which serves as the dielectric. In another process, a metallic paste, for example a silver paste, is applied to the faces of glass plates and a stack of the paste coated plates is fired so that metallic electrode layers are provided within an interposed glass dielectric layer. With either of these methods, indeed with any method, if highly stable and uniformly reliable capacitors are to be produced, the dielectric layer itself must possess certain critical electrical properties. Accordingly, the dielectric layer must have a high dielectric constant, a low temperature coefficient for capacitance over a wide temperature range embracing both high and low temperatures and a low power loss at about room temperature and at elevated temperatures. The dielectric layer must also be capable of being deposited as a relatively thin film or coating, must form a good bond with the capacitor plates or electrodes and must possess other properties which will be apparent from this specification and/or which are well known to those skilled in the art.

For a capacitor to be employed in applications which require stable electrical characteristics under widely varying environmental conditions, the glass dielectric composition should have the following electrical characteristics: (1) tan $\delta$ at 25° C. should be below about 0.0001, (2) tan $\delta$ at 125° C. should be below about 0.002, (3) the dielectric constant should be at least 10 and (4) $T_c$ (temperature coefficient for capacitance) should be equal to 140±25 p.p.m./° C. average, both from 25 to —55° C. and from 25 to 125° C.

It will be apparent to those skilled in the art that few ordinary glass compositions possess the necessary electrical and other properties to be employed as dielectric layers in highly stable, quality capacitors and that glass compositions which are known to be suitable in such applications ordinarily have high viscosities. High viscosity is not a prohibitive or limiting factor in the methods described briefly hereinabove, where preformed glass plates are employed. Viscosity and other application characteristics are important limitations, however, in methods where glass coated plates or electrodes are the basic elements in the stack that is fused together to form the capacitor. For example, in the method described and claimed in U.S. Patent No. 3,305,914, assigned to the assignee of this invention, conductor tabs are dipped into a dielectric or glass slip, fired, stacked and fused together to form basic capacitor units. In this method particularly where the conductor tabs are fabricated from aluminum or alloys thereof, the glass dielectric must have a low viscosity and fusion temperature and other good application properties to be coated onto the tabs in uniform coherent void and bubble-free layers. The glass dielectric must have a low viscosity so that it can be fired onto the aluminum tabs at temperature below 625° C. With the barium-borate glass compositions, it has been found that the sag point, an index of glass viscosity, should not exceed 400° C. for the successful application of dielectric coatings onto aluminum tabs. The glass must have good flow characteristics when fired onto the tabs to achieve a smooth uniform and bubble-free coating, must have good adherence to the tabs after firing and must be resistant to devitrification so that the glass can withstand subsequent heat schedules employed in fusing coated tabs into basic capacitor units and, where desired, fusing encapsulating envelopes about the basic units. The problem of attaining satisfactory functional electrical properties in the product or article is thus further complicated by the physical and chemical properties required in the process.

Accordingly, it is the general object of this invention to provide novel glass compositions particularly suitable for use as capacitor dielectrics.

An object of the invention is to provide a novel low viscosity glass composition having electrical and other properties which make the composition suitable for application as coatings and for use as a dielectric layer.

Another object of this invention is to provide capacitors with dielectric layers of barium-borate glasses having stable electrical characteristics under widely varying environmental conditions.

Yet another object of this invention is to provide capacitors comprised of aluminum plates or electrodes and glass dielectric layers that maintain desirable electrical characteristics over wide temperature ranges.

Further objects and advantages of this invention will become apparent as the following description proceeds and features of novelty which characterize the invention will be pointed out in particularity in the claims annexed to and forming a part of this specification.

For a better understanding of the invention, reference may be had to the accompanying drawing in which the figure is a perspective section of a glass-metal capacitor, representing an embodiment of the invention.

The barium-borate glass compositions of this invention are prepared by melting batches of the ingredients in certain critical proportions in a clay crucible placed in an electric furnace held at a temperature of about 1800° F., fining at this temperature for approximately 45 minutes plus stirring as an aid to homogenizing the melt. The molten glass is quenched in water or air to form a frit to make the subsequent reduction of particle size easier. The glass frit is then ground, for example, by ball milling in a suitable vehicle such as alcohol to form slip of finely divided particles suspended in the vehicle. The finely divided particles may, for example, have a particle size of 325 mesh or finer.

Barium-borate glasses in accordance with this invention may be prepared from batch compositions having the following constituents in about the indicated proportions:

| Constituents | Weight Percentages | |
|---|---|---|
| | Composition Range | Preferred Range |
| BaO | 25-35 | 28-32 |
| $B_2O_3$ | 18-25 | 20-24 |
| ZnO | 5-15 | 9-12 |
| $K_2O$ | 5-10 | 6-8 |
| $SiO_2$ | 5-10 | 6-8 |
| $TiO_2$ | 1-8 | 4-7 |
| $Al_2O_3$ | 1-6 | 3-4 |
| $Na_2O$ | 1-5 | 2-4 |
| LiF | 1-3 | 1.5-2.5 |
| CdO | 1-10 | 2-5 |
| CaO | 0.5-5 | 0.5-3 |
| $As_2O_3$ | 0-1 | 0.3-0.7 |
| PbO | 0-3 | 0.25-2 |
| SrO | 0-5 | 0-3 |
| $Bi_2O_3$ | 0-3 | 0-2 |
| $La_2O_3$ | 0-3 | 0-2 |
| $Cu_2O$ | 0-3 | 0-2 |
| $ZrO_2$ | 0-2 | 0-1.5 |

In order to more fully describe the present invention, specific examples of batch compositions are presented in Table I. hereinbelow. Preferably, these ingredients are mixed for at least one hour before melting. The melting, fining, mixing, quenching and ball-milling steps outlined hereinabove are employed in the preparation of each sample.

TABLE I.—BATCH COMPOSITIONS
[Weight Percentages]

| Constituents | Sample No. 1 | Sample No. 2 | Sample No. 3 | Sample No. 4 |
|---|---|---|---|---|
| BaO | 31.26 | 31.14 | 31.16 | 30.21 |
| $B_2O_3$ | 22.89 | 24.91 | 24.42 | 22.50 |
| ZnO | 10.00 | 9.95 | 9.96 | 10.73 |
| $K_2O$ | 6.62 | 6.59 | 6.59 | 7.32 |
| $SiO_2$ | 5.69 | 5.67 | 5.67 | 6.84 |
| $TiO_2$ | 5.96 | 5.94 | 5.94 | 6.30 |
| $Al_2O_3$ | 4.86 | 4.84 | 3.46 | 3.35 |
| $Na_2O$ | 2.43 | 2.42 | 2.42 | 3.45 |
| LiF | 2.77 | 2.76 | 2.76 | 1.61 |
| CdO | 2.49 | 1.94 | 4.97 | 4.83 |
| CaO | 0.77 | 0.77 | 0.77 | 0.75 |
| $As_2O_3$ | | | | 0.67 |
| SrO | 2.16 | | | |
| PbO | | | | 0.50 |
| $Bi_2O_3$ | | 2.07 | | |
| $La_2O_3$ | | 1.00 | | |
| $Cu_2O$ | 2.08 | | | 0.94 |
| $ZrO_2$ | | | 1.38 | |

It should be noted that the ingredients $As_2O_3$, SrO, PbO, $Bi_2O_3$, $La_2O_3$, $Cu_2O$ and $ZrO_2$ are optionally included. The inclusion of $As_2O_3$ and at least one of the other oxides is preferred. The $As_2O_3$ offers a further refined improvement in flow characteristics, the SrO and $La_2O_3$ improve the dielectric constant, the PbO and $Bi_2O_3$ extend the application characteristics and all extend the resistance to devitrification. Comparatively, the optional ingredients do not contribute as much as the basic composition to the improved properties but the additional benefits are nonetheless desirable and advantageous. When employed, about 0.25%, by weight, is an effective amount for each of the optional ingredients.

Because of the volatility of some of the ingredients, the final composition of the glass will vary to a small degree from the batch composition but in a generally known predictable manner. The foregoing samples were 2 pound melts and up to about 50%, by weight, of the fluorine may be lost by vaporization during the melting operation. Up to about one-fifth of the alkali metal oxides and up to about one-fourth of the $B_2O_3$ may be volatilized and lost. Since there is some pick-up from the clay crucible, there may also be about an additional 2%, by weight, of $SiO_2$ and about 2%, by weight, of $Al_2O_3$. An increase of 2% of $SiO_2$ in Sample No. 1, for example, could produce a final composition with 7.69% of $SiO_2$. It is also to be understood that the final composition will not contain the compound LiF, as such. The lithium will be converted to the oxide $Li_2O$ and the fluorine will be present either in solution or in complex form with one or more of the various oxides. Since methods do exist for determining its concentration, the fluorine is reported as such.

The final barium-borate glass compositions of this invention will have the following constituents in about the indicated proportions, expressed in weight percentages:

| Constituents | Total Range | Preferred Range |
|---|---|---|
| BaO | 25-35 | 28-32 |
| $B_2O_3$ | 17-24 | 18-23 |
| ZnO | 5-15 | 9-12 |
| $K_2O$ | 4-10 | 5-8 |
| $SiO_2$ | 5-11 | 6-9 |
| $TiO_2$ | 1-8 | 4-7 |
| $Al_2O_3$ | 1-7 | 3-5 |
| $Na_2O$ | 1-5 | 2-4 |
| $Li_2O$ | 0.5-3.0 | 0.8-1.5 |
| F | 0.5-3.0 | 0.8-1.5 |
| CdO | 1-10 | 2-5 |
| CaO | 0.5-5 | 0.5-3 |
| $As_2O_3$ | 0-1 | 0.3-0.7 |
| SrO | 0-5 | 0-3 |
| PbO | 0-3 | 0.25-2 |
| $Bi_2O_3$ | 0-3 | 0-2 |
| $La_2O_3$ | 0-3 | 0-2 |
| $Cr_2O$ | 0-3 | 0-2 |
| $ZrO_2$ | 0-2 | 0-1.5 |

It is to be understood that the composition ranges recited are critical in attaining both the desired functional and application properties. For example, if the composition contains less than 25%, by weight, of BaO, the dielectric constant will be low. More than 35%, by weight, of BaO will produce a glass with a poor resistance to devitrification. If the barium-borate composition contains less than 17%, by weight, of $B_2O_3$, the temperature coefficient for capacitance will be too high. More than 24%, by weight, of $B_2O_3$ will produce a significantly lower chemical durability and more than 8%, by weight, of $TiO_2$ will lower the resistance to devitrification. The use of some $TiO_2$ is necessary as it improves chemical durability and simultaneously maintains a low viscosity. While the $B_2O_3$ was very effective in reducing the viscosity (sag point value) and the temperature coefficient for capacitance, larger amounts lowered the dielectric constant. An increase in the amounts of $K_2O$ and $Na_2O$ and LiF were helpful in improving the flow characteristics but they raised the temperature coefficient for capacitance so rapidly that their use had to be appropriately limited.

In Table II, hereinbelow, a summary of test results is presented on samples prepared from the compositions outlined in Table I. Sag point test specimens were formed from each of the samples in Table I. Each sample of glass was formed into a rod approximately 5 centimeters long having a diameter of 0.2±0.05 millimeter. The sag point was determined in accordance with the method and with apparatus described in Hirayama in an article entitled "The Sag Point of Glasses," published in the Journal of the American Ceramic Society, volume 45, Number 3, March 1962, pages 113-115. The sag point may be correlated with the softening point, both indices being measured by observing the bending or elongation, respectively, of heated fibers under given conditions and both being functions of the glass viscosity.

The electrical properties were measured on samples 2 inches in diameter cast from each of the exemplary batch compositions of Table I. Each of these samples was ground to a thickness of about 0.1 inch. Silver electrodes were painted on the discs. Dielectric constants, dissipation factors and temperature coefficients were measured at 1,000 c.p.s. with a General Radio Digital Bridge #1615A. The temperature coefficient of capacitance was determined by measurements at 25° C. and at −55° C., the change in capacitance over this temperature range being reported in parts per million per degree centigrade. The temperature coefficient of capacitance was similarly measured at 25° C. and at 125° C. and similarly calculated for that temperature range. Reference may be had to MIL-STD-202 for details on test procedures. It is apparent from the summary of test results presented in Table II that the glasses of this invention have comparatively low viscosities and that deposited coatings of these compositions have excellent electrical characteristics.

TABLE II.—SUMMARY OF PROPERTIES

| Property | Sample No. 1 | Sample No. 2 | Sample No. 3 | Sample No. 4 |
|---|---|---|---|---|
| Sag Point (° C.) | 395 | 393 | 378 | 371 |
| Dielectric Constant | 11.0 | 11.0 | 10.0 | 11.4 |
| Tan) at 25° C. (Percent) | 0.04 | 0.05 | 0.05 | 0.042 |
| Tan ( at 125° C. (percent) | 0.10 | 0.12 | 0.11 | 0.104 |
| $T_c$. 25 to $-55°$ C. (p.p.m./° C.) | 149 | 143 | 140 | 134 |
| $T_c$, 25 to 125° C. (p.p.m./° C.) | 164 | 164 | 158 | 162 |

The glass compositions of the invention may be readily formed into plates and rods or coated onto metal sheets or other materials as thin films. The thin films may be deposited on metal sheets, for example, from a slip containing the finely divided glass particles suspended in a volatile liquid vehicle such as ethanol. The metal sheets may be conveniently dipped into the slip and withdrawn with a coating of the slip deposited thereon. The rheological properties of the slip will be such that a thin but uniform coating in the order of ¼ to 2 mils in thickness may be deposited. Coatings were successfully made when fired in a furnace held at about 600° C. for about 1 minute. A second coating may be applied and fired without adversely affecting the quality of the original coat. Since the glass compositions of this invention have a sufficiently low viscosity at temperatures of about 600° C. to be fused and bonded to the metal sheet or to other low viscosity glass coatings in contact therewith, they are especially suitable for use with low melting metals such as aluminum and alloys thereof which have a melting point in the order of about 660° C.

Referring now to the single figure of the drawing, there is illustrated a capacitor 10 constructed in accordance with the invention from two capacitor core assemblies 11, 12. To form the core assemblies 11, 12, the metal plates 13, 14, which are fabricated from aluminum foil having a thickness of about ½ mil, are dipped into a slip containing finely divided suspended particles of one of the glasses described in the foregoing examples. The plates are preferably cleaned and degreased before this operation so that a thin but uniform coating is deposited on the plates. The plates are heated in an oven or furnace at a temperature of about 600° C. for about 1 minute so that the slip vehicle is volatilized and the glass particles fuse and flow uniformly over the plates. In this manner, the plates 13, 14 may be provided with dielectric glass coatings 15, 16 having a thickness of about ¼ mil.

The entire plate is not dipped into the glass slip so that a portion of each plate 13, 14 is uncoated, thus providing the terminal tabs 17, 18 to which terminal wires (not illustrated) may be conveniently connected by welding or other securing methods. The tabs 17, 18 may also be separate plates, secured to the plates 13, 14 to which auxiliary terminals may be attached outside of the dielectric glass coating or even outside of the encapsulating envelope, if one is employed. The coated core assemblies are placed in a suitable heated press and refired to weld the assemblies into a monolithic mass with confronting plate surfaces separated by the dielectric glass coating. The confronting area and the distance between the plates are controlled to provide a desired capacitance. It should be understood that larger numbers of core assemblies may be stacked, welded together and electrically connected either in parallel or in series to provide capacitors of varied design. It should also be understood that the glass compositions of this invention are suitable for use in the convenient rapid automated methods described in U.S. Patent No. 3,305,914, assigned to the assignee of this invention.

It should be understood that while the glass compositions of this invention appear to have a primary utility as a capacitor dielectric coating, particularly with capacitor plates of aluminum or alloys thereof, other uses will occur to those skilled in the art. For example, the high dielectric constants indicate that the compositions may have utility in electroluminescent devices.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. A glass composition having a high dielectric constant, low dissipation factor, low temperature coefficient of capacitance and low sag point consisting essentially of the following constituents in about the indicated proportions:

| Constituents: | Weight percent |
|---|---|
| BaO | 25–35 |
| $B_2O_3$ | 17–24 |
| ZnO | 5–15 |
| $K_2O$ | 4–10 |
| $SiO_2$ | 5–11 |
| $TiO_2$ | 1–8 |
| $Al_2O_3$ | 1–7 |
| $Na_2O$ | 1–5 |
| $Li_2O$ | 0.5–3.0 |
| F | 0.5–3.0 |
| CdO | 1–10 |
| CaO | 0.5–5 |

2. A glass composition having a high dielectric constant, low dissipation factor, low temperature coefficient of capacitance and low sag point consisting essentially of the following constituents in about the indicated proportions:

| Constituents: | Weight percent |
|---|---|
| BaO | 28–32 |
| $B_2O_3$ | 18–23 |
| ZnO | 9–12 |
| $K_2O$ | 5–8 |
| $SiO_2$ | 6–9 |
| $TiO_2$ | 4–7 |
| $Al_2O_3$ | 3–5 |
| $Na_2O$ | 2–4 |
| $Li_2O$ | 0.8–1.5 |
| F | 0.8–1.5 |
| CdO | 2–5 |
| CaO | 0.5–3 |
| $As_2O_3$ | 0.3–0.7 |

3. A glass composition having a high dielectric constant, low dissipation factor, low temperature coefficient of capacitance and low sag point consisting essentially of the following constituents in about the indicated proportions:

| Constituents: | Weight percent |
|---|---|
| BaO | 25–35 |
| $B_2O_3$ | 17–24 |
| ZnO | 5–15 |
| $K_2O$ | 4–10 |
| $SiO_2$ | 5–11 |
| $TiO_2$ | 1–8 |
| $Al_2O_3$ | 1–7 |
| $Na_2O$ | 1–5 |
| $Li_2O$ | 0.5–3.0 |
| F | 0.5–3.0 |
| CdO | 1–10 |
| CaO | 0.5–5 |
| $As_2O_3$ | 0–1 |
| SrO | 0–5 |

| Constituents: | Weight percent |
|---|---|
| PbO | 0.25–3 |
| $Bi_2O_3$ | 0–3 |
| $La_2O_3$ | 0–3 |
| $Cu_2O$ | 0–3 |
| $ZrO_2$ | 0–2 |

4. A glass composition having a high dielectric constant, low dissipation factor, low temperature coefficient of capacitance and low sag point consisting essentially of the following constituents in about the indicated proportions:

| Constituents: | Weight percent |
|---|---|
| BaO | 28–32 |
| $B_2O_3$ | 18–23 |
| ZnO | 9–12 |
| $K_2O$ | 5–8 |
| $SiO_2$ | 6–9 |
| $TiO_2$ | 4–7 |
| $Al_2O_3$ | 3–5 |
| $Na_2O$ | 2–4 |
| $Li_2O$ | 0.8–1.5 |
| F | 0.8–1.5 |
| CdO | 2–5 |
| CaO | 0.5–3 |
| $As_2O_3$ | 0.3–0.7 |
| SrO | 0–3 |
| PbO | 0.25–2 |
| $Bi_2O_3$ | 0–2 |
| $La_2O_3$ | 0–2 |
| $Cu_2O$ | 0–2 |
| $ZrO_2$ | 0–1.5 |

5. An electronic capacitor comprising a plurality of metal plates having confronting surfaces separated by a dielectric layer of glass, the dielectric glass consisting essentially of the following constituents in about the indicated proportions:

| Constituents: | Weight percent |
|---|---|
| BaO | 25–35 |
| $B_2O_3$ | 17–24 |
| ZnO | 5–15 |
| $K_2O$ | 4–10 |
| $SiO_2$ | 5–11 |
| $TiO_2$ | 1–8 |
| $Al_2O_3$ | 1–7 |
| $Na_2O$ | 1–5 |
| $Li_2O$ | 0.5–3.0 |
| F | 0.5–3.0 |
| CdO | 1–10 |
| CaO | 0.5–5 |

6. The electronic capacitor of claim 5 in which the metal plates are plates of a metal selected from the group consisting of aluminum and aluminum alloys.

7. An electronic capacitor comprising a plurality of metal plates having confronting surfaces separated by a dielectric layer of glass, the dielectric glass consisting essentially of the following constituents in about the indicated proportions:

| Constituents: | Weight percent |
|---|---|
| BaO | 28–32 |
| $B_2O_3$ | 18–23 |
| ZnO | 9–12 |
| $K_2O$ | 5–8 |
| $SiO_2$ | 6–9 |
| $TiO_2$ | 4–7 |
| $Al_2O_3$ | 3–5 |
| $Na_2O$ | 2–4 |
| $Li_2O$ | 0.8–1.5 |
| F | 0.8–1.5 |
| CdO | 2–5 |
| CaO | 0.5–3 |
| $As_2O_3$ | 0.3–0.7 |

8. The electronic capacitor of claim 7 in which the metal plates are plates of a metal selected from the group consisting of aluminum and aluminum alloys.

9. An electronic capacitor comprising a plurality of metal plates having confronting surface separated by dielectric layers of glass, the dielectric glass consisting essentially of the following constituents in about the indicated proportions:

| Constituents: | Weight percent |
|---|---|
| BaO | 25–35 |
| $B_2O_3$ | 17–24 |
| ZnO | 5–15 |
| $K_2O$ | 4–10 |
| $SiO_2$ | 5–11 |
| $TiO_2$ | 1–8 |
| $Al_2O_3$ | 1–7 |
| $Na_2O$ | 1–5 |
| $Li_2O$ | 0.5–3.0 |
| F | 0.5–3.0 |
| CdO | 1–10 |
| CaO | 0.5–5 |
| $As_2O_3$ | 0–1 |
| SrO | 0–5 |
| PbO | 0.25–3 |
| $Bi_2O_3$ | 0–3 |
| $La_2O_3$ | 0–3 |
| $Cu_2O$ | 0–3 |
| $ZrO_2$ | 0–2 |

10. The electronic capacitor of claim 9 in which the metal plates are plates of a metal selected from the group consisting of aluminum and aluminum alloys.

11. An electronic capacitor comprising a plurality of metal plates having confronting surfaces separated by a dielectric layer of glass, the dielectric glass consisting essentially of the following constituents in about the indicated proportions:

| Constituents: | Weight percent |
|---|---|
| BaO | 28–32 |
| $B_2O_3$ | 18–23 |
| ZnO | 9–12 |
| $K_2O$ | 5–8 |
| $SiO_2$ | 6–9 |
| $TiO_2$ | 4–7 |
| $Al_2O_3$ | 3–5 |
| $Na_2O$ | 2–4 |
| $Li_2O$ | 0.8–1.5 |
| F | 0.8–1.5 |
| CdO | 2–5 |
| CaO | 0.5–3 |
| $As_2O_3$ | 0.3–0.7 |
| SrO | 0–3 |
| PbO | 0.25–2 |
| $Bi_2O_3$ | 0–2 |
| $La_2O_3$ | 0–2 |
| $Cu_2O$ | 0–2 |
| $ZrO_2$ | 0–1.5 |

12. The electronic capacitor of claim 11 in which the metal plates are plates of a metal selected from the group consisting of aluminum and aluminum alloys.

References Cited

UNITED STATES PATENTS

| | | | |
|---|---|---|---|
| 2,606,841 | 8/1952 | Armistead | 106—52 |
| 2,956,219 | 10/1960 | Cianchi | 317—258 |
| 3,005,721 | 10/1961 | Cerulli | 106—47 |
| 3,277,020 | 10/1966 | Janakirama-Rao | 106—54 X |
| 3,290,535 | 12/1966 | Hirayama | 106—54 X |

HELEN M. McCARTHY, *Primary Examiner.*

TOBIAS E. LEVOW, JAMES E. POER, *Examiners.*

W. SATTERFIELD, *Assistant Examiner.*